Sept. 4, 1951 J. R. DAY 2,566,826

SAWTOOTH FREQUENCY MODULATOR

Filed Feb. 3, 1948 3 Sheets-Sheet 1

INVENTOR.
JAMES R. DAY
BY
Moses, Nolte, Crews & Berry
ATTORNEYS

Sept. 4, 1951 J. R. DAY 2,566,826

SAWTOOTH FREQUENCY MODULATOR

Filed Feb. 3, 1948 3 Sheets-Sheet 2

INVENTOR.
JAMES R. DAY
BY
Moses, Nolte, Crews & Berry
ATTORNEYS

SAWTOOTH FREQUENCY MODULATOR

Filed Feb. 3, 1948 3 Sheets-Sheet 3

ACTUAL WAVE SHAPE AT 16

WAVE SHAPE AT 4-08

WAVE SHAPE AT 4-13

WAVE SHAPE AT 4-19

WAVE SHAPE AT 4-21

INVENTOR.
JAMES R. DAY
BY
Moses, Nolte, Crews & Berry
ATTORNEYS

Patented Sept. 4, 1951

2,566,826

UNITED STATES PATENT OFFICE 2,566,826

SAWTOOTH FREQUENCY MODULATOR

James R. Day, Peconic, N. Y.

Application February 3, 1948, Serial No. 5,988

17 Claims. (Cl. 332—9)

The present invention pertains to the generation of wide swing frequency modulated signals and more particularly to the generation of such signals by the phase shift method utilizing a base wave of accurately controlled sawtooth wave shape.

An object of the invention is the provision of a generator of wide swing frequency modulated signals especially suitable for broadcasting service by reason of a marked improvement in the signal to noise ratio in the modulated signal with respect to the signal to noise ratio obtained with the usual frequency modulating devices.

A further object of the invention is the provision of a phase shift type of frequency modulator in which a relatively large amount of phase shift is obtained without appreciable distortion of the signal nor appreciable increase in the amount of noise present in the signal as a result of the phase modulation process.

Still another object of the invention is the provision of a frequency modulator of this type in which the introduction of noise into the modulated signal is minimized by the elimination of all uncontrolled oscillation generators and by appropriate damping of all oscillatory circuits. The invention avoids the use of gaseous discharge tubes, multivibrators, or other circuits operating to produce an unusually steep portion in the output wave shape without effective control of the exact timing or phase of such steep portions.

A further object of the invention is the provision of a phase shift type of frequency modulator which adapts itself with unique simplicity to the process of "cascading," or sequentially iterating the modulation without increase in the distortion of the signal and with an effective increase in the modulation to noise ratio as compared to the non-cascaded process. In using this arrangement, a plurality of modulation stages are cascaded and a portion of the total modulation is produced in each stage.

A further object of the invention is the provision of a phase shift modulator comprising a degenerative feed back circuit which tends to balance out noise and distortion produced in the modulator circuit.

Other and further objects will become apparent upon reading the following specification together with the accompanying drawing forming a part hereof:

Referring to the drawing.

Figure 1:
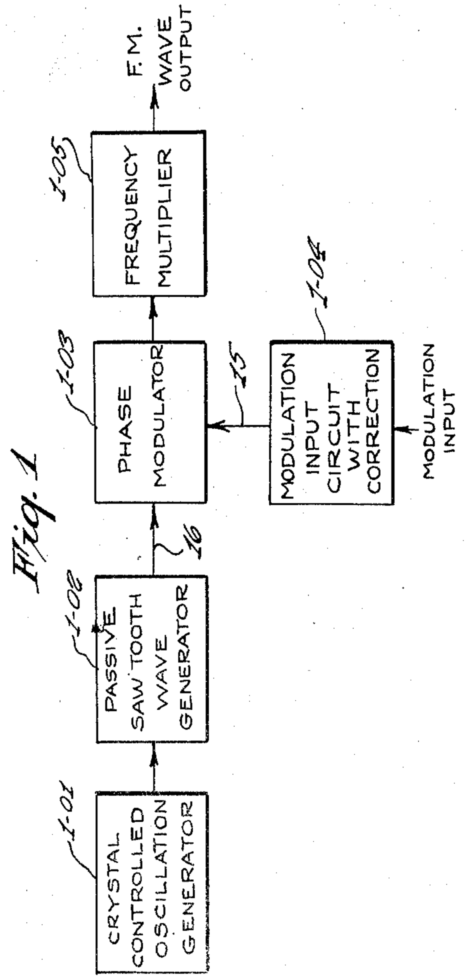
Fig. 1 is a diagrammatic representation of an embodiment of the invention.

Referring to Fig. 1, it will be seen that the frequency modulator comprises an oscillator 1—01 having a high degree of frequency stability which is designated by way of illustration as being controlled by a piezo-electric crystal. The output of this oscillator is shown connected to a passive sawtooth generator 1—02 which modifies the shape of the output wave of the oscillator 1—01 to provide a sawtooth base wave which in turn is applied to the phase modulator 1—03.

The modulating signals are applied to the input circuit 1—04 which includes a corrector network arranged to convert the amplitudes of the modulating potentials to such relative values that the phase modulator 1—03 will deliver a frequency modulated output. This corrector arrangement is known in the art and modifies the amplitudes of the modulating potentials so that the amplitudes of the various components are inversely proportional to their respective frequencies, thereby providing an output such that modulating potentials of equal amplitudes produce equal frequency deviations regardless of the frequency of the particular modulating potential.

The frequency modulated signals are multiplied up in frequency by the frequency multiplier 1—05 to the desired frequency for transmission either by conduction, by radiation, or other manner. Frequency multiplier 1—05 is conventional in all respects and may take any desired form.

Figure 2:
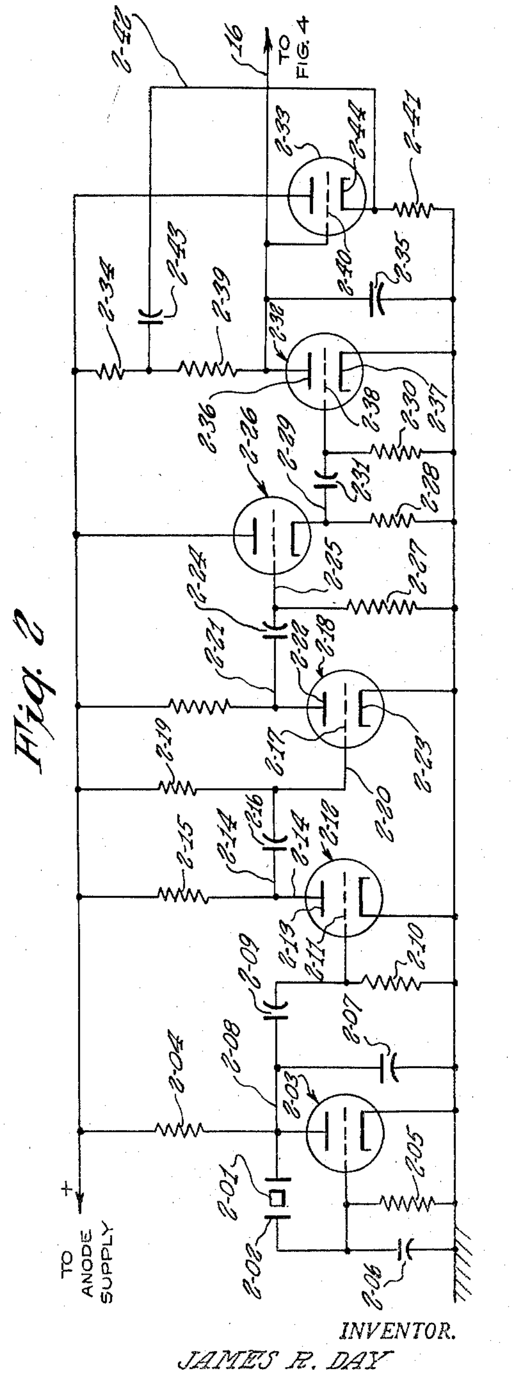
Fig. 2 is a circuit diagram of a sawtooth wave generator used in practicing the invention.

Referring to Fig. 2, a sawtooth wave generator is shown, which produces an output wave of extremely accurate linearity and having an output amplitude of about 25 volts peak to peak at conductor 16 which is connected to phase modulator 13.

A quartz crystal 2—01 is shown mounted in the usual crystal holder 2—02 which is in turn connected to a triode 2—03. Triode 2—03 is shown connected to resistors 2—04 and 2—05 and capacitors 2—06 and 2—07 as a conventional Colpitts oscillator with the crystal operating near its series resonant frequency. The frequency of oscillation is controlled by crystal 2—01. In practice, crystal 2—01 may operate at a frequency of 100 kilocycles which is convenient numerically for use with the frequency multiplier 1—05 which follows the phase modulator 1—03. 100 kilocycles is also in a frequency range at which good performance may readily be obtained from the crystal and from the circuits associated therewith.

Figures 3A, 3B:
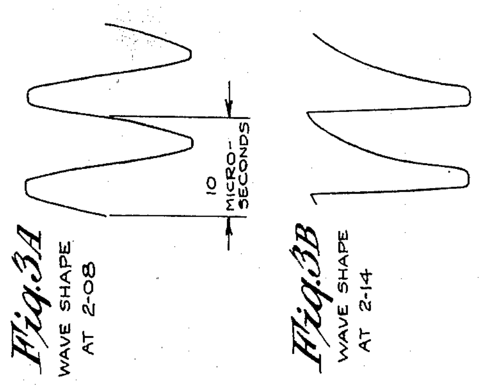
Figs. 3A to 3F illustrate wave shapes at various points in the circuit of Fig. 2.

The shape of the output wave from triode 2—03 is illustrated in Fig. 3A, this being the shape of the voltage wave at conductor 2—08. This voltage is applied through a coupling capacitor 2—09 to a resistor 2—10 and the grid 2—11 of a triode 2—12. The combination of capacitor 2—09 and resistor 2—10 is so proportioned with respect to the operating characteristics of triode 2—12 that the shape of the voltage wave (excluding the direct current component produced by the anode supply) at anode 2—13 and conductor 2—14 will be as shown in Fig. 3B. The shape illustrated results in part from the drawing of current by grid 2—11 of triode 2—12 and in part by the time constant of the resistance-capacitance combination comprising the capacitor 2—09 and resistor 2—10. Anode voltage for triode 2—12 is supplied through coupling resistor 2—15.

Figures 3C, 3D, 3E, 3F, 4:
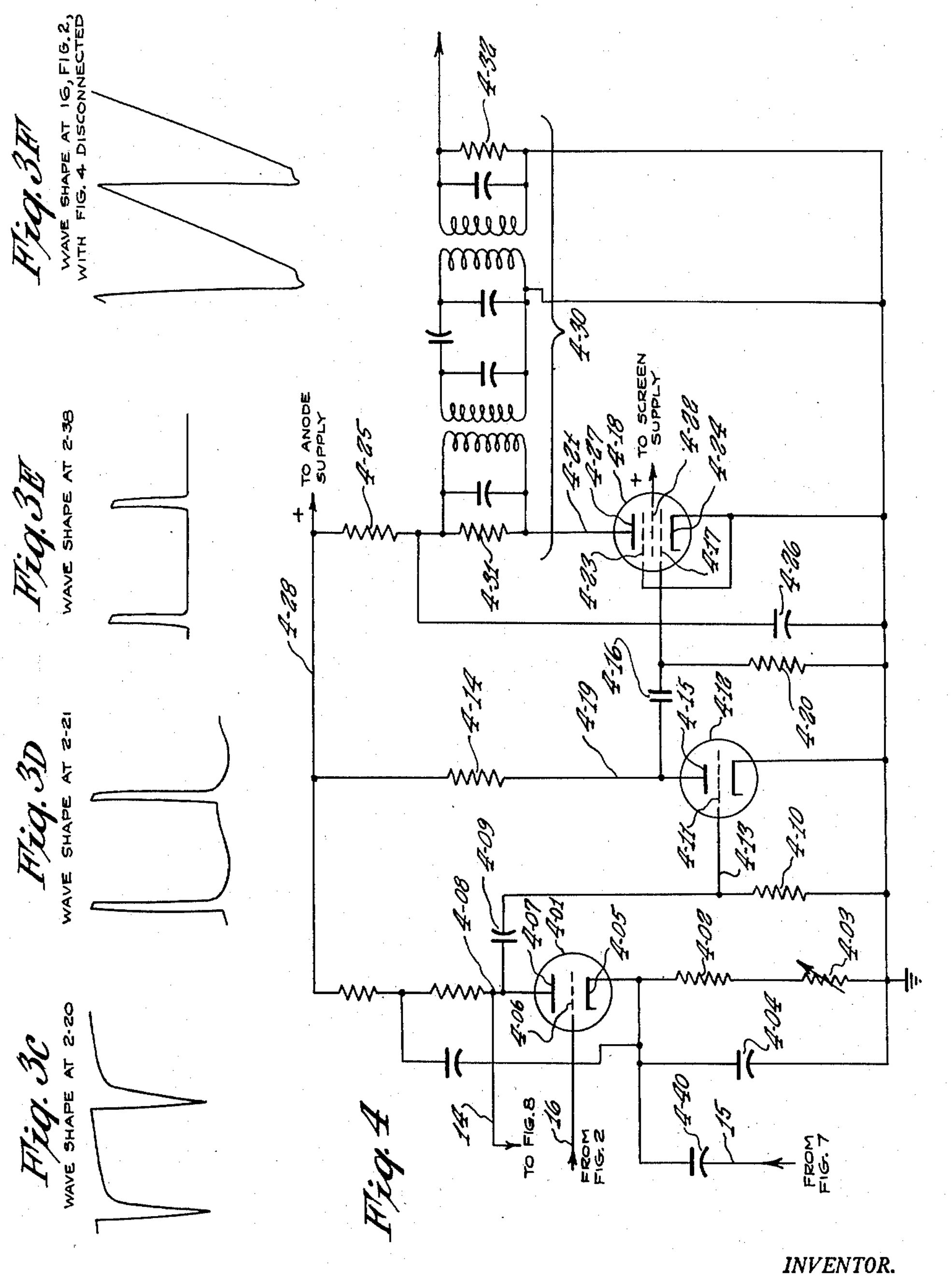
Fig. 4 is a circuit diagram of a phase modulator used in practicing the invention.

The output of triode 2—12 is applied via conductor 2—14 and capacitor 2—16 to grid 2—17 of triode 2—18 and to resistor 2—19. The combination of capacitor 2—16 and resistor 2—19 acting with triode 2—18 has a differentiating action. The resulting shape of the voltage wave at grid 2—17 of triode 2—18 is shown in Fig. 3C and appears on conductor 2—20. It will be noted that the original sinusoidal wave produced at oscillator triode 2—03 has been modified so that its shape exhibits definite pulse-like characteristics. The spacing between successive pulses is 10 microseconds, this interval being determined by the crystal controlled 100 kilocycle oscillator. The shape of the voltage wave at conductor 2—21 which is connected to anode 2—22 of triode 2—18 is illustrated in Fig. 3D. The downwardly extending negative pulses shown in Fig. 3C and which are applied to the grid 2—17 of triode 2—22 are dimensioned to produce substantially complete cutoff of anode current in triode 2—18 for an interval whose duration is approximately equal to that of the negative pulse. The cutoff causes the potential at anode 2—22 of triode 2—18 to rise sharply to a peak value of short duration after which it returns sharply to a reduced value. Between pulses, grid 2—17 of triode 2—18 is maintained at a potential close to the potential of its associated cathode 2—23 by resistor 2—19.

The short pulse shown in Fig. 3D is applied through coupling capacitor 2—24 to the grid 2—25 of triode 2—26 which is shown connected as a cathode follower. Grid 2—25 is maintained at a suitable direct current potential by resistor 2—27 which is shown connected to ground. Cathode resistor 2—28 of cathode follower triode 2—26 is so adjusted that current is drawn by grid 2—25 at the crest of each pulse and so that 2—26 is self-biased during each interval between successive pulses to a voltage beyond cutoff. This has the effect of eliminating from the output of triode 2—26 the irregularities in wave amplitude in the base line of the input wave.

These irregularities may be seen in Fig. 3D, and the resulting output wave with the irregularities eliminated is illustrated in Fig. 3E. It will be observed in Fig. 3E that the base line of the wave between pulses is clean and of constant amplitude. The voltage wave shown in Fig. 3E is derived from cathode resistor 2—28 by conductor 2—29 and represents the voltage across resistor 2—30 applied thereto through coupling capacitor 2—31.

The sawtooth wave is generated from the pulses of Fig. 3E derived from triode 2—26. The sawtooth itself is produced by the rapid discharge of capacitor 2—35 through a circuit extending from anode 2—36 to cathode 2—37 of triode 2—32 each time a positive pulse of short duration is applied to grid 2—38. The sloping portion of the sawtooth is derived from the charging characteristics of capacitor 2—35. This charging rate is necessarily logarithmic in character, but a large part of the inherent curvature is avoided by charging the capacitor 2—35 to only a small fraction, such as ten percent, of the full charging potential. The remaining curvature of the charging characteristic is further reduced to obtain an extremely high degree of linearity by the combination of triode 2—33 and resistor 2—34 which are connected to form a so-called "bootstrap" circuit arranged to compensate at each instant for the potential building up across the terminals of capacitor 2—35 as a result of the charging current. The resulting wave shape is shown in Fig. 3F and is delivered to the phase modulator by conductor 16. The high degree of linearity of the sloping portion of the sawtooth is of primary importance for the successful operation of the invention, as will be hereinafter pointed out.

The application of the positive pulse of Fig. 3E to grid 2—38 of triode 2—32 causes this tube to become conductive and to discharge capacitor 2—35 to a low potential. In the embodiment illustrated, this may be about 5 volts in a time of approximately one microsecond. Current flows through resistors 2—34 and 2—39 producing a rapid and substantial voltage drop across them. After the termination of the positive pulse, grid 2—38 drops to a potential below cut-off and conduction through triode 2—32 immediately ceases. Thereupon charging current begins to flow through resistor 2—39 into capacitor 2—35 raising the potential of output conductor 16. Grid 2—40 of triode 2—33 is connected to conductor 16, triode 2—33 being connected as a cathode follower. The high potential side of cathode output resistor 2—41 is connected by a conductor 2—42 and a coupling capacitor 2—43 to the high potential side of coupling resistor 2—39. The resulting sawtooth output wave at cathode 2—44 of triode 2—33 is added to the anode supply potential so that the voltage drop across resistor 2—39 remains substantially constant during the charging interval of capacitor 2—35, thereby maintaining a constant charging rate in capacitor 2—35. This constant charging rate results in a constant rate of voltage rise, the degree of constancy determining the accuracy of linearity of the sloping portion of the sawtooth wave shown in Fig. 3F. By appropriate selection of circuit constants, the degree of linearity may be made sufficiently accurate so that any remaining deviation from absolute linearity will be of insufficient magnitude to have any appreciable effect upon the operation of the invention.

The sawtooth generator shown in Fig. 2 thus provides a sawtooth voltage at conductor 16 having extremely accurate linearity throughout the building up portion of the cycle followed by a flyback interval of relatively short duration.

Referring to Fig. 4, a phase modulator circuit is illustrated which utilizes the sawtooth voltage generated in Fig. 2 and combines the sawtooth voltage with modulating potentials to obtain a wide swing frequency modulated wave. A triode 4—01 is self biased by resistor 4—02 and variable resistor 4—03 together with by-pass capacitor 4—04. These resistors and the capacitor 4—04 are so proportioned that the voltage between cathode 4—05 and ground remains substantially constant throughout the complete cycle of each sawtooth wave. The magnitude of this constant voltage is so adjusted that the sawtooth wave applied to grid 4—06 will not cause current to flow to anode 4—07 of triode 4—01 until the sawtooth voltage has attained a value of approximately one-half of its peak value. Capacitor 4—04 operates as a by-pass with respect to the sawtooth wave. The characteristics of triode 4—01 are such that shortly after grid 4—06 is raised in potential to a point where conduction takes place to anode 4—07, grid current is drawn by grid 4—06. This current, which would otherwise add to the charge on capacitor 2—35 of Fig. 2, results in a truncated sawtooth voltage wave on conductor 16 of a shape illustrated in Fig. 5A. The shape shown in Fig. 3F, which would be present at the output of Fig. 2 in the absence of an output load is thus modified so that the peaks are clipped by the drawing of grid current through conductor 16 by grid 4—06 of triode 4—01 in Fig. 4. The shape of the output wave at conductor 4—08 is illustrated in Fig. 5B. It will be noted that this wave is substantially rectangular in shape and that the width of the top portions of the successive waves will be determined by the particular point along the upward slope of each individual sawtooth of the wave at which conduction through triode 4—01 first occurs. The end of each period of conduction is determined by the flyback portion of the sawtooth wave and will, therefore, not vary appreciably in its phase position.

Figure 5A:
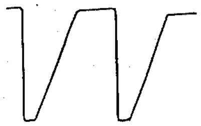
Figs. 5A to 5F illustrate wave shapes at various portions of the circuits of Fig. 4 in the absence of modulation.
Figure 5B:
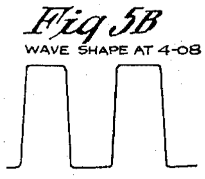
Figure 5C:
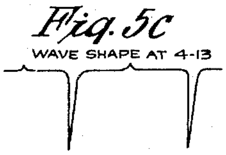
Figure 5D:
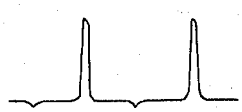
Figure 5E:
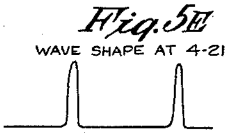

The series combination of capacitor 4—09 and resistor 4—10 provides a differentiating circuit which converts the rectangular wave of Fig. 5B to a series of sharp pulses. These pulses are applied to the grid 4—11 beyond cutoff. The trailing edge of each rectangular wave produces a corresponding positive pulse which is absorbed by the drawing of grid current. This voltage at conductor 4—13 is shown in Fig. 5C. The phase position of the positive pulse is determined by the flyback portion of the sawtooth and is, therefore, substantially independent of any modulating voltage applied to triode 4—01. By reason of the action of plate resistor 4—14, each negative peak applied to grid 4—11 produces a sharp positive rise in voltage at anode 4—15 which is coupled by capacitor 4—16 to the control grid 4—17 of a pentode 4—18. The shape of the voltage wave at conductor 4—19 is illustrated in Fig. 5D. The control grid 4—17 of pentode 4—18 is returned to ground through a resistor 4—20 whose value is such that grid current drawn during the positive pulse biases pentode 4—18 to cutoff between successive pulses. This results in an output wave shape for pentode 4—18 at conductor 4—21 which is illustrated in Fig. 5E. Screen 4—22 is connected to a suitable source of potential. Suppressor grid 4—23 is connected to the cathode 4—24 in the usual manner. A dropping resistor 4—25 and by-pass capacitor 4—26 cause anode 4—27 to operate at a potential below that of the common anode supply conductor 4—28.

Figure 5F:
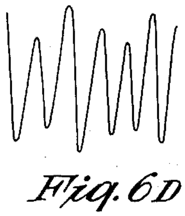

Connected in the output of pentode 4—18 is a group of damped resonant circuits designated generally as 4—30 which comprising input and output terminating resistors 4—31 and 4—32 respectively. The effective or average resonant frequency of the tuned circuits will ordinarily be a multiple or harmonic of the frequency of oscillator 1—01. The third harmonic, for example, has been found to give good results in practice. In the example illustrated, this would be a frequency of 300 kilocycles. If only a single tuned circuit were used, and in the absence of any modulating potentials, this would result in a wave of the shape illustrated in Fig. 5F. This represents a 300 kilocycle wave with appreciable 100 kilocycle amplitude modulation. By the use of a plurality of tuned circuits, however, the amount of 100 kilocycles amplitude modulation is considerably reduced. The adjustment of the circuits shown is such that they constitute, in effect, a band-pass filter in which the width of the pass band is sufficient to accommodate the maximum frequency deviation of the frequency modulated signals at the selected harmonic frequency plus twice the highest modulating frequency to be transmitted. All other frequencies, such as 100 kilocycle side bands, will be suppressed. In the example illustrated, because of subsequent frequency multiplication, the resonant circuits 4—30 would be adjusted in normal broadcasting practice to pass a total frequency deviation of about plus or minus 300 cycles and a maximum modulating frequency of 15 kilocycles. This would permit the circuits to start suppressing undesired frequencies about 15.3 kilocycles above and about 15.3 kilocycles below the average or center frequency of 300 kilocycles. The 100 kilocycle oscillator frequency is thus suppressed together with a reduction in the magnitude of the second and fourth harmonics which fall appreciably outside the pass band of the group of resonant circuits 4—30.

The foregoing description of operation of Fig. 4 and the wave shapes heretofore illustrated apply in the absence of modulating potentials. Modulating potentials are applied to Fig. 4 via conductor 15 which is connected to the cathode 4—05 of triode 4—01 through a blocking capacitor 4—40. A change in the potential of cathode 4—05 with respect to ground will cause a change in the point along the straight portion of the sawtooth wave at which triode 4—01 begins to conduct. If the cathode is made more positive, conduction will begin later, as shown by the narrow truncated tops of the sawtooth wave in dotted lines at the top of Fig. 6A. If it is made more negative, conduction will begin earlier, as shown by the wide truncated sawtooth wave in dotted lines at the bottom of Fig. 6A. Since the sawtooth is very accurately linear with respect to time, the advance or retardation of the instant at which conduction begins will be a linear time function of the modulating voltage.

Figure 6A:
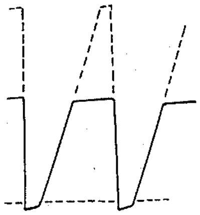
Figs. 6A to 6D illustrate wave shapes at various points of the circuits of Fig. 4 during modulation.
Figure 6B:
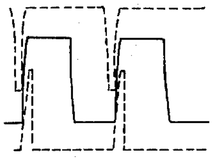
Figure 6C:
Figure 6D:
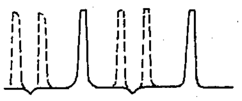

Fig. 6A illustrates the effect of the maximum permissible modulating potentials on the unmodulated wave of Fig. 5A. Fig. 6B illustrates the effects of these potentials on the rectangular wave of Fig. 5B. Fig. 6C shows the displacement of the negative pulses of Fig. 5C and Fig. 6D shows the corresponding effect on the wave of Fig. 5D. In Fig. 6A, a positive modulating potential delays the beginning of conduction in triode 4—01 preserving nearly the entire sawtooth. Conversely, a negative modulating potential causes conduction to begin earlier so that substantially the entire sawtooth is absorbed by the drawing of grid current.

The late beginning of conduction in response to a positive modulating potential narrows the rectangular wave shown in Fig. 6B. Similarly, a negative modulating potential widens the wave. The negative pulse shown in Fig. 6C is retarded in response to a positive modulating potential and advanced in response to a negative modulating potential. Corresponding conditions are shown in Fig. 6D. These conditions could be reversed by modification of the circuits shown, without interfering with the operation of the invention. The linearity of the sawtooth must be retained, however, and the proportionality of pulse phase displacement as a function of modulating potential must also be preserved.

The resulting phase displacement of the pulse causes corresponding variations in the frequency of oscillation of the tuned circuits 4—30, resulting in the production of a wide swing frequency modulated wave. This frequency modulated wave may be multiplied in frequency in the usual manner to any desired extent so that it will have the desired frequency for radiation or other form of transmission. It should be noted, however, that the frequency deviations are multiplied in magnitude along with the center frequency so that the maximum deviation produced in the modulator should be the proper submultiple of the maximum deviation to be transmitted after multiplication.

Figure 7:
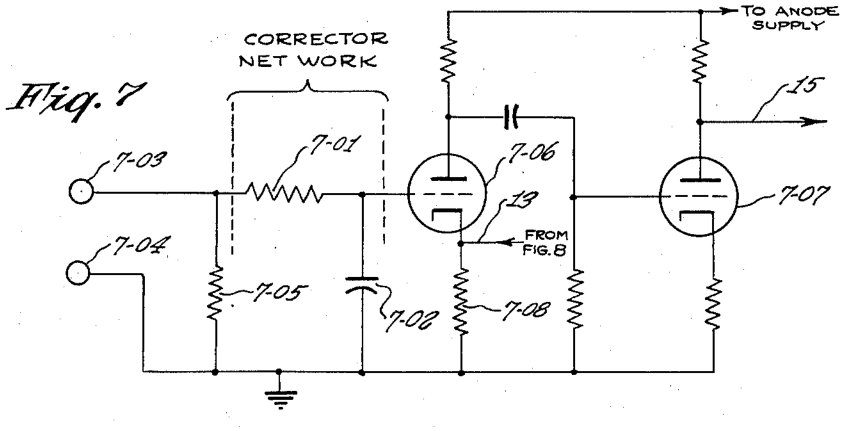
Fig. 7 is a circuit diagram of a modulation corrector network and amplifier.

Since the system of modulation is of the phase shift type, it is necessary to introduce the usual corrector network in order to obtain a frequency modulated output, in which the deviation of the frequency is proportional to the magnitude of the modulating potential and is independent of the frequency of the modulating potential. Such a corrector network is shown in Fig. 7 and comprises the series combination of resistor 7—01 and capacitor 7—02. The input is applied to terminals 7—03 and 7—04. Bridged across these terminals is a terminating resistor 7—05 of value appropriate for the termination of the input circuit. Resistor 7—01 is large compared to the impedance of capacitor 7—02 throughout the range of modulating frequencies. This causes the magnitude of the current through resistor 7—01 to be substantially independent of frequency throughout the range involved. As a result, the voltage drop across capacitor 7—02 is substantially inversely proportional to the frequency and may, therefore, be used to derive a frequency modulated output from a modulator of the phase shift type. This situation is well-known in the art and need not be explained in detail.

The modified modulating voltage is applied to the grid of a triode 7—06 which is shown connected to a further triode 7—07, the two triodes forming a conventional resistance coupled amplifier. The output of this amplifier is shown connected via conductor 15 to the blocking capacitor 4—40 of Fig. 4. The amplification and energy output of the amplifier comprising the triodes 7—06 and 7—07 must be suitable to vary the potential at cathode 4—05 of triode 4—01 in accordance with the modulating potentials.

Figure 8:
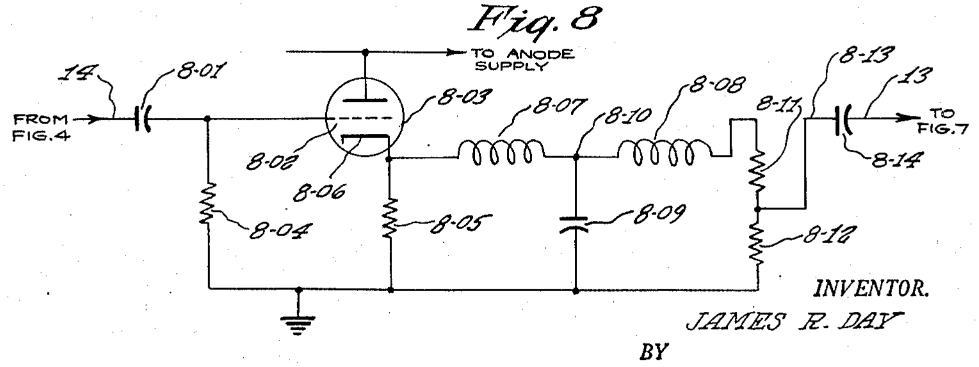
Fig. 8 is a circuit diagram of a feed-back circuit used in reducing noise and distortion.

In order that noise and distortion may be further reduced, a degenerative feedback circuit may be used in conjunction with the modulator herein described. Such a feedback circuit is illustrated in Fig. 8. The wave shape at the output of 4—01 which is illustrated in Figs. 5B and 6B is rectangular in shape and the variations in the width during modulation of the upwardly extending or positive going portions of the wave are directly proportional to the modulating voltage. These rectangular waves are applied from conductor 4—08 via conductor 14 to a coupling capacitor 8—01 to the grid 8—02 of a triode 8—03 which is shown connected as a cathode follower. Grid 8—02 is shown returned to ground through resistor 8—04. The output of cathode follower 8—03 is derived from cathode resistor 8—05. Capacitor 8—01 and resistor 8—04 are so proportioned that the carrier frequency components are passed through to grid 8—02 and the components in the range of modulation frequencies are rendered ineffective.

The value of cathode resistor 8—05 is so adjusted that cathode 8—06 will not follow grid 8—02 completely in the positive going sense. As a result, grid 8—02 draws current during a portion of each cycle. This current produces a negative charge which remains temporarily as an additional bias and causes cut-off in cathode follower 8—03 during the more negative portions of each rectangular wave. The output of cathode follower 8—03 is, therefore, a wave of rectangular shape in which the corners are sharpened, the sides are more nearly vertical straight lines, and the top and bottom portions are more nearly horizontal straight lines. The width of these rectangular waves varies with the modulating potential applied to Fig. 4, narrowing as the modulating potential applied to cathode 4—05 becomes more positive and widening as this potential becomes more negative. The carrier frequency components together with sideband frequencies are removed by a low pass filter which is shown by way of illustration as comprising the two series connected inductors 8—07 and 8—08 with the shunt capacitor 8—09 connected to the junction 8—10 between the inductors. The filtered output is connected to the series combination of resistors 8—11 and 8—12. These resistors are so proportioned that the desired fraction of the total output is delivered to conductor 8—13 and thence through a blocking capacitor 8—14 to conductor 13. Conductor 13 extends to the high potential side of cathode resistor 7—08 associated with amplifier triode 7—06 in Fig. 7. It will be noted that this potential is applied in the degenerative sense. As a consequence, potentials which appear at the output of modulator triode 4—01 but which do not appear at the input terminals 7—03 and 7—04 of Fig. 7 produce voltages which tend to balance out such potentials. These potentials which are thus reduced in magnitude will be of the nature of noise and distortion arising during the process of modulation, and also random phase noise occurring in the circuits of Fig. 2. The level of the modulation input to Fig. 7 must be increased to overcome the degenerative effect of the feedback circuit of Fig. 8. In practice, it has been possible to secure a degenerative effect of the magnitude of 20 decibels using the circuits illustrated.

It will be noted that the amplification provided by the tubes 7—06 and 7—07 of Fig. 7 is necessary only insofar as the desired amount of phase modulation feedback may require it. If it is not desired to employ such feedback in a particular application, the corrector network shown in Fig. 7, and comprising resistor 7—01 and capacitor 7—02, may be directly connected to conductor 15 of Fig. 4. When this is done the effective value of the shunt capacitive reactance involved in the correction process becomes that of capacitor 7—02 in parallel with the series connected value of capacitors 4—40 and 4—04. It has been discovered that in systems not employing the phase modulation feedback described, such a direct connection of the corrector network to the modulation terminals comprising the cathode of 4—01 and ground, provides the largest ratio of modulation to noise originating in the audio frequency branch of the system. The decrease in this ratio which occurs when amplification as shown in Fig. 7 is interposed between the corrector and the modulation terminals is more than overcome by the phase modulation feedback, for which latter the interposed amplification will have been employed.

Referring to Fig. 5D which exhibits the frequency modulated pulses applied to the grid circuit of the harmonic generator tube 4—18, it will be seen that they generally resemble those of Fig. 3D which were used originally in the generation of the sawtooth wave. Instead of applying the pulses of Fig. 5D to a harmonic generator, they may be employed to generate a second sawtooth wave by application to a duplicate of the circuit extending from capacitor 2—24 of Fig. 2 to capacitor 4—16 of Fig. 4. The second sawtooth wave generated in the interior of this duplicate circuit will be modulated to the extent of the modulating signal at the first modulator cathode designated 4—05 of Fig. 4. Identical or independent modulation applied to the cathode of the second or duplicate modulator gives rise to added advances and retardations of the eventual pulses appearing at the duplicate conductor 4—19. In the case where the modulating voltages applied are identical, the resultant modulation will have been doubled. The circuit constants and tube electrode potentials are adjusted to give similar wave shapes at corresponding points of the duplicate circuits. The nonlinearities accompanying the second modulation are no greater than those accompanying the first and, since the modulation has been doubled, the sum of the nonlinearities of the iterated modulations is no greater a percentage of the total modulation than is the case for a single modulation. Random noise occurring in the second modulation is equal to that arising in the first modulation and the two combine in root-mean-square fashion, according to the law for statistically random effects. Although the modulation will have been doubled the noise is only increased by a factor equal to the square root of 2, yielding a gain in the so-called "signal-to-noise ratio" of the square root of 2, or 3 decibels.

The process of cascading may be extended indefinitely and is eventually limited only by matters of practicality.

Phase modulation feedback as described above may be applied individually to each of the cascaded modulators, or, in the case of identical modulation, overall, extending from the final modulator to a common point of the modulation input circuit.

The magnitude of phase shift which may be produced without distortion is determined by the length of the linear portion of the sawtooth base wave and not by the limitations which apply where reactance tubes are utilized.

I have described what I believe to be the best embodiments of my invention. I do not wish, however, to be confined to the embodiments shown, but what I desire to cover by Letters Patent is set forth in the appended claims.

I claim:

1. The method of employing an electron discharge device having an anode, a cathode, and a control grid to produce a frequency modulated wave in response to a signal wave voltage, said method comprising attenuating the components of the signal voltage in proportion to their frequency to produce a corrected signal voltage, producing a sawtooth wave having a voltage which is relatively large with respect to the grid-cathode voltage required to change the anode current from negative grid cut-off to positive grid limitation, each sawtooth of said sawtooth wave having an extended slope of accurate linearity, applying said relatively large sawtooth voltage between the grid and cathode to produce anode current in response to the sawtooth voltage at a point substantially midway of the accurately linear slope thereof in the absence of signal voltage and to produce positive grid truncation of the sawtooth voltage on the grid and thereby to produce positive grid limitation of the anode current shortly after anode current is produced in response to the sawtooth voltage, varying in accordance with said corrected signal voltage the point on said accurately linear slope at which the sawtooth voltage produces anode current, and deriving the desired frequency modulated wave from the resulting anode current pulses.

2. The method of producing a frequency modulated wave according to claim 1, including the steps of filtering out from the anode current pulses, components of the signal wave frequency, detecting the resulting components which are not filtered out from the anode current pulses, removing from the detected current, components having the frequency of said anode current pulses and the frequency of the signal wave side bands thereof, and degeneratively feeding back to the grid and cathode, the remaining unremoved components of the detected current to balance out noise and distortion components arising in the production of said anode current pulses and in the production of said sawtooth wave.

3. A modulator for producing a frequency modulated wave in response to a signal wave voltage, comprising an electron discharge device having an anode, a cathode, and a control grid, means for attenuating the components of the signal voltage in proportion to their frequency to produce a corrected signal voltage, a sawtooth wave source having a voltage which is relatively large with respect to the grid-cathode voltage required to change the anode current from negative grid cut-off to positive grid limitation, each sawtooth of the sawtooth wave having an extended slope of accurate linearity, means for applying said relatively large sawtooth voltage between the grid and cathode to produce anode current in response to the sawtooth voltage at a point substantially midway of the accurately linear slope thereof in the absence of signal voltage and to produce positive grid truncation of the sawtooth voltage on the grid and thereby to produce positive grid limitation of the anode current shortly after anode current is produced in response to the sawtooth voltage, means to apply the corrected signal voltage between the grid and cathode to vary the point on said linear slope at which the sawtooth voltage produces anode current, and means to derive the desired frequency modulated wave from the resulting anode current pulses.

4. A modulator according to claim 3 including feedback means coupled from said anode and cathode to said grid and cathode, said feedback means including a detector responsive to said anode current pulses, means for rendering the detector unresponsive to components of the anode current pulses having the signal wave frequency, and a filter degeneratively connected from said detector to said grid and cathode, to transmit to the grid and cathode, components of the detected currents having the signal wave frequency.

5. A generator of sawtooth waves comprising a source of oscillations of substantially constant frequency, wave shape modifying means arranged to change the wave shape of the oscillations to a succession of uniformly spaced pulses, a capacitor, discharge means responsive to each pulse arranged to produce a conductive path for discharging the capacitor, a charging circuit for the capacitor, compensating means responsive to the charging of the capacitor arranged to cause such charging to take place at a substantially uniform rate, said compensating means including a discharge device having an anode, a cathode and a grid, a resistor connecting said cathode with one terminal of said capacitor, said grid being connected with the other terminal of said capacitor, said anode being connected to a point in said charging circuit, and a connection from said cathode to said charging circuit between the point of connection of said anode thereto and the terminal of said capacitor connected to said grid.

6. A generator as in claim 5 in which the connection from said cathode to said charging circuit includes a capacitor.

7. A modulating system for producing a phase modulated wave in response to a signal wave voltage, comprising a source of sawtooth waves, means having input and output terminals for converting said sawtooth waves into rectangular waves in which the phase of one edge of each wave is timed to originate when a predetermined voltage is applied to said input terminals, means for applying the signal wave voltage to said input terminals to modulate the phase of said timed edge in accordance with the voltage of said signal wave, means coupled to said output terminals for detecting said rectangular waves, filter means responsive to the resulting detected wave to remove therefrom components of the frequency of said rectangular waves and of the signal wave side bands thereof, and feedback means coupling the output of said filter in degenerative relation to the input terminals of said converting means to balance out noise and distortion components arising in said converting means and said source of sawtooth waves.

8. A modulating system according to claim 7 in which filter means are connected between the output terminals of said wave converting means and said detecting means to pass to said detecting means components of the frequency of said rectangular wave and side bands thereof and to render ineffective the transmission to said detecting means of components of the frequency of said signal wave voltage.

9. A modulating system according to claim 7 in which said detecting means includes means for repeating said rectangular waves with more sharpened corners, more vertical straight line sides, and more horizontal straight line top and bottom portions.

10. A generator of frequency modulated signals comprising in combination: a source of sawtooth waves of substantially constant frequency, each wave being shaped to comprise an extended portion of accurate linearity, a source of modulating potentials, a first wave shape modifying means responsive to the modulating potentials and arranged to convert the sawtooth waves into rectangular waves whose width is substantially directly proportional to the instantaneous magnitude of the modulating potentials, a second wave shape modifying means arranged to convert the rectangular waves into a succession of pulses whose time spacing varies in accordance with the respective widths of the successive rectangular waves, a corrector network interposed between the source of modulating potentials and the first wave shape modifying means to attenuate the components of the modulating potentials in proportion to their frequency, a plurality of resonant circuits disposed to be activated by the pulses for producing a frequency modulated wave, and detecting means responsive to the average width of the successive rectangular waves coupled in a degenerative sense to the first wave shape modifying means and tending to balance out noise and distortion arising in the source of sawtooth waves and between the source of modulating potentials and the rectangular waves.

11. A generator as in claim 10 in which the resonant circuits are damped to a degree at which the oscillations which would otherwise tend to be sustained are constrained to follow the phase variations produced by the displacement of the successive pulses.

12. The method of frequency modulation which comprises attenuating the components of a modulating wave in proportion to their frequencies to produce a corrected modulating wave, providing a periodically recurring voltage pulse of short duration, separately supplying said corrected modulating wave to each of a plurality of modulating steps in cascade, modulating the phase of said pulse in response to the corrected modulating wave in each of said steps, and deriving the desired frequency modulated wave from the last of said steps.

13. The method of modulating the frequency of a carrier wave by an amount corresponding to a peak phase shift of more than 180° in substantially linear relationship to the modulating wave, which comprises attenuating the components of a modulating wave in proportion to their frequencies to produce a corrected modulating wave, phase modulating the carrier wave by the corrected modulating wave in each of a plurality of successive steps, supplying to each of said steps a train of input pulses having a predetermined timing, producing in each of said steps a train of sawtooth waves in response to said input puses, and producing in each of said steps a train of output pulses in which the timing of each pulse is under the joint control of the corrected modulating wave and the linear slope of the sawtooth wave, deriving the input pulses for each of said steps from the train of output pulses from the next previous one of said successive steps, and deriving the desired frequency modulated wave by selectively damping the train of output pulses from the last of said steps.

14. A generator of frequency modulated waves comprising means for attenuating the components of a modulating wave in proportion to their frequencies to produce a corrected modulating wave, a plurality of modulating stages in cascade relation, means for transmitting a periodically recurring voltage pulse of short duration to the first of said cascade stages and from each of said stages to the next succeeding cascade stage, means for applying the corrected modulating wave to each of said stages, means in each of said stages responsive to the corrected modulating wave applied to said stage for modulating therein the phase of the pulse transmitted to said stage, and means for deriving the desired frequency modulated wave from the last of said stages.

15. A generator of frequency modulated waves comprising a source of sawtooth waves having extended portions of accurate linearity, means for originating a pulse during the accurately linear portion of each sawtooth of the waves, means for deriving a further similar sawtooth wave from each pulse, further means for originating a pulse during the accurately linear portion of each further sawtooth, means for attenuating the components of a modulating wave in proportion to their frequencies to produce a corrected modulating wave, modulating means arranged to displace the points of origin of the pulses simultaneously in accordance with the corrected modulating wave, and means for deriving damped sinusoidal oscillations from the further pulses.

16. A frequency modulator of the phase shift type comprising correcting means for attenuating the components of a modulating wave in proportion to their frequencies to produce a corrected modulating wave, a plurality of pulse phase modulating stages in cascade, each of said stages having pulse input terminals for receiving a periodically recurring pulse of short duration, modulating wave input terminals connected to said correcting means to receive the corrected modulating wave therefrom, and phase modulated pulse output terminals, the output terminals of each of said stages, except the last being connected to the pulse input terminals of the next succeeding cascade stage, and means for deriving from the output terminals of the last of said cascade stages a wave which is frequency modulated in accordance with the first mentioned modulating wave.

17. A modulator of the phase shift type for modulating the frequency of a carrier wave, comprising correcting means for attenuating the components of a modulating wave in proportion to their frequency to produce a corrected modulating wave, a plurality of phase modulating stages in cascade, each of said stages having carrier wave input terminals, modulating wave input terminals connected to said correcting means to receive the corrected modulating wave therefrom, and phase modulated carrier wave output terminals, the output terminals of each of said stages except the last being connected to the carrier wave input terminals of the next succeeding cascade stage, means for transmitting a train of carrier wave pulses to the carrier wave input terminals of the first of said stages, each of said stages including means responsive to pulses derived from said pulse transmitting means, to produce a train of sawtooth waves having accurately linear slopes, means responsive to said train of sawtooth waves for producing a train of output pulses, and means for modulating the phase of said output pulses under the joint control of the corrected modulating wave and the linear slope of the sawtooth wave; and means for deriving the desired frequency modulated wave from the output terminals of the last of said stages.

JAMES R. DAY.

REFERENCES CITED

The following references are of record in the file of this patent:

UNITED STATES PATENTS

| Number | Name | Date |
|---|---|---|
| 2,227,596 | Luck | Jan. 7, 1941 |
| 2,266,401 | Reeves | Dec. 16, 1941 |
| 2,280,693 | Evans | Apr. 21, 1942 |
| 2,280,707 | Kell | Apr. 21, 1942 |
| 2,411,130 | Evans | Nov. 12, 1946 |
| 2,419,606 | Stodola | Apr. 29, 1947 |
| 2,438,927 | Labin et al. | Apr. 6, 1948 |
| 2,441,418 | Houghton | May 11, 1948 |

OTHER REFERENCES

Article, "Cascade Phase Shift Modulator" by M. Marks, 6 pages reprinted from December 1946 issue of Electronics.